Patented Apr. 25, 1939

2,155,946

UNITED STATES PATENT OFFICE 2,155,946

INSECTICIDAL OIL SPRAY

Daniel G. Loetscher, Hammond, Ind., assignor to Standard Oil Company, Chicago, Ill., a corporation of Indiana No Drawing. Application March 10, 1937, Serial No. 130,148

3 Claims. (Cl. 167—34)

This invention relates to insecticidal oil sprays and it pertains more particularly to oil sprays of the so-called soluble oil type. An object of the invention is to increase the effectiveness of oil sprays against insect pests such as codling moth infesting deciduous trees and insect pests such as scale, mealy bugs, etc. infesting citrus trees.

Heretofore the use of lead arsenate has been deemed essential in the control of codling moth and this gives rise to lead residues remaining on fruit. The fruit must be thoroughly washed for the removal of such lead residues, and even then there is considerable danger to public health because lead is a cumulative poison.

An object of my invention is to prepare an oil spray which will be so effective against codling moth that the use of lead and other dangerous poisons may be entirely eliminated.

A further object is to increase the effectiveness of nicotine in oil sprays, to simplify the application of nicotine and to provide a compound of nicotine with another toxic substance which will result in a product more toxic than either of them.

A further object is to avoid the necessity of adding separate toxic compositions to emulsions in the spray tank by incorporating in the oil itself not only the emulsifier but the toxic elements which are required for effective insect control. Other objects will be apparent as the detailed description of my invention proceeds.

The invention is applicable to oil sprays of all types whether applied as an aqueous emulsion, atomized and applied from airplanes or applied in a mixture with other liquids or solids. One of the important applications of the invention is in a codling moth tree spray. The oil in such a spray is preferably a highly refined mineral oil such as technical white oil having a viscosity of about 80 seconds Saybolt at 100° F. The emulsifier preferably consists of about 2% aluminum oleate (aluminum cottonseed soap is very good) and about 1% glycol mono-oleate or glycerol mono-oleate. It should be understood, however, that any other hydroxy esters of high molecular weight organic acids may be employed, together with other aluminum soaps, as covered by Knight Patents 1,949,798-9 and pending Knight applications.

For combating codling moth the above spray oil is emulsified in water and applied to the trees at intervals of a few weeks during the entire growing season, the first two or three sprays being applied in a ¾% concentration and later sprays being applied in ½% concentration (i. e., ½ part oil per 100 parts water). Heretofore it has been necessary even with the best sprays available to combine "lead and lime" with the oil in the first two or three applications. In the first spray, for instance, three pounds of lead arsenate and three pounds of lime are mixed with each 100 gallons of spray emulsion, which, as above pointed out, contains about ¾% oil. After the first two or three applications it has been found that the lead and lime may be omitted, but in many cases it is necessary to employ an additional poison to supplement the action of the oil. One of the most useful and widely accepted poisons is nicotine which has been applied as such or in the form of nicotine sulfate, and which has also been applied in admixture with bentonite and so-called fixed nicotine compositions. In all of these cases, however, the nicotine is water-soluble and it must therefore be mixed with the emulsion in the field at the time of actual spraying.

I have discovered that nicotine can be combined with naphthenic acid to form a nicotine naphthenate which, when prepared with a slight excess of naphthenic acid, is perfectly oil-soluble, and which can thus be incorporated in the oil along with the oil soluble emulsifier. By including the nicotine in the soluble oil I avoid the necessity and nuisance of adding toxic powders or solutions to the spray tank in the field and I insure the use of proper proportions of poison to oil. I avoid the possibility of a spray operator incorporating too much or too little of the poison when applying the oil in the field.

I prepare the nicotine naphthenate by reacting free nicotine (50% solution in water) with naphthenic acid. About two parts by weight of the 50% nicotine solution is first heated to remove the water therefrom, leaving one part by weight of nicotine. To this I add about 1.5 to 1.6 parts of naphthenic acid. Agitation and moderate heating accelerates reaction and insures complete combination of all the nicotine. Using nicotine naphthenate prepared in this manner, the following formula was prepared and tested in the field:

| | Per cent |
|---|---|
| Acme white oil (80 vis. at 100° F.) | 91 |
| Aluminum naphthenate | 2.5 |
| Glycerol mono-oleate | 1.5 |
| Nicotine naphthenate | 5.0 |

The above mixture was bright, i. e., showed no haze or separation even after long standing, and it had the emulsification properties which have been found essential for tree sprays of this type. In the field tests the above spray was compared with a similar soluble oil which contained no nicotine naphthenate but to which four parts of oil per part of nicotine sulfate was incorporated in the emulsion at the time of application. Although the nicotine sulfate was thus employed at 25% concentration based on oil, while the nicotine naphthenate was only employed at 5% based on oil, it was found that the nicotine naphthenate gave far superior protection against codling moth. This is probably due to the fact that the aluminum soap and hydroxy ester tended to keep the oil on the surface of the leaf (as shown by Knight), and since the nicotine was in oil soluble form it was likewise held on the leaf surface. The nicotine sulfate or other water soluble nicotine compounds would naturally have a greater tendency to run off the leaf with the aqueous component of the spray (called the "drip") and would be more likely to be washed off the leaf by rain or removed therefrom or rendered inert by evaporation or atmospheric conditions.

Another possible explanation lies in the toxic effect of the naphthenic acid component of the nicotine naphthenate. The naphthenic acids which I employ are thus obtained from the kerosene fraction of naphthenic crudes, although acids from the gasoline and gas oil fractions might also be used. The average molecular (combining) weight of these naphthenic acids is about 150 to 250, preferably about 170 to 210, and their acid number should be from about 225–370 (milligrams of potassium hydroxide per gram of sample). Naphthenic acids of this type have been found to be extremely toxic to plant parasites, and it appears that this toxicity is due to the naphthenic radical which I have combined with the extremely toxic nicotine radical to produce a resultant insecticide far exceeding the effectiveness of either of the original materials.

I have found that if the ratio of dry nicotine to naphthenic acid is more than 1 to 1.5 there is a tendency for the oil solution of the resulting nicotine naphthenate to separate out on standing. The theoretical portions of nicotine to naphthenic acid should be about 1 part nicotine to 1.17 parts naphthenic acid. I employ 1 part nicotine to 1.5 or 1.6 parts naphthenic acid and it appears that this slight excess of naphthenic acid is essential for obtaining complete oil solubility.

In different types of soluble oil sprays I find it is possible to markedly increase the nicotine component of the nicotine naphthenate. Thus in the following formula:

| | Per cent |
|---|---|
| Light mineral oil | 90.5 |
| Aluminum oleate | 2.0 |
| Purified mahogany soap | 1.85 |
| Soda rosin soap | .65 |
| Nicotine naphthenate | 4.0 |

I find that it is possible to employ 162 parts of nicotine to 25 parts of naphthenic acid, so that in said formula there is 3.46% of nicotine and .54% of naphthenic acid. In the above formula I have found that the nicotine-naphthenic acid ratio may be varied from about 1:1 to 7:1. The mahogany soap referred to hereinabove is described in Adams et al. Patent 2,039,377.

While I have described the use of nicotine naphthenate in two types of soluble oil tree sprays, it should be understood that they may be incorporated in any other type of oil sprays or in oil which is applied by the so-called "Vapo-dust" method from airplanes. In oil sprays for citrus trees I prefer to employ white oils or refined oils of slightly lower viscosity, usually from about 40 to 60 seconds Saybolt at 100° F.

The effectiveness of the nicotine naphthenate oil sprays may be still further increased by the incorporation therein of about 1 to 4% or more of oil soluble viscoresins, an example of which is the product resulting from the polymerization of isobutylene effected by the use of boron fluoride at temperatures of about −40 to −80° F. These viscous products have the property of increasing the tendency of the oil to stick to the surface of the leaf and fruit and they tend to hold the nicotine naphthenate even more firmly than it is held by the oil per se. With material as toxic and effective as nicotine naphthenate in oil sprays it should be possible to avoid entirely the use of lead arsenate and other cumulative poisons which now constitute such a menace to public health.

While my invention is primarily directed to the preparation and use of nicotine naphthenate in oil sprays, it should be understood that I also employ other oil soluble nicotine compounds such as nicotine oleate.

I claim:
1. The method of increasing the solubility of nicotine naphthenate in oil sprays which comprises employing a slight excess of naphthenic acid over the amount theoretically required for the chemical combination of naphthenic acid and nicotine.

2. A white oil tree spray containing in oil solution a small amount of an aluminum soap, a smaller amount of a hydroxy ester of a high molecular weight organic acid and about 1 to 10% of nicotine naphthenate containing an excess of naphthenic acid.

3. An improved tree spray comprising a refined mineral oil contanng about 5% of nicotine naphthenate with a slight excess of naphthenic acid sufficient to insure oil solubility.

DANIEL G. LOETSCHER.